Nov. 15, 1927. 1,649,136
E. D. SMITH ET AL
AUTOMATIC BATTERY CHARGING AND VOLTAGE REGULATING SYSTEM
Filed May 27, 1922 2 Sheets-Sheet 2
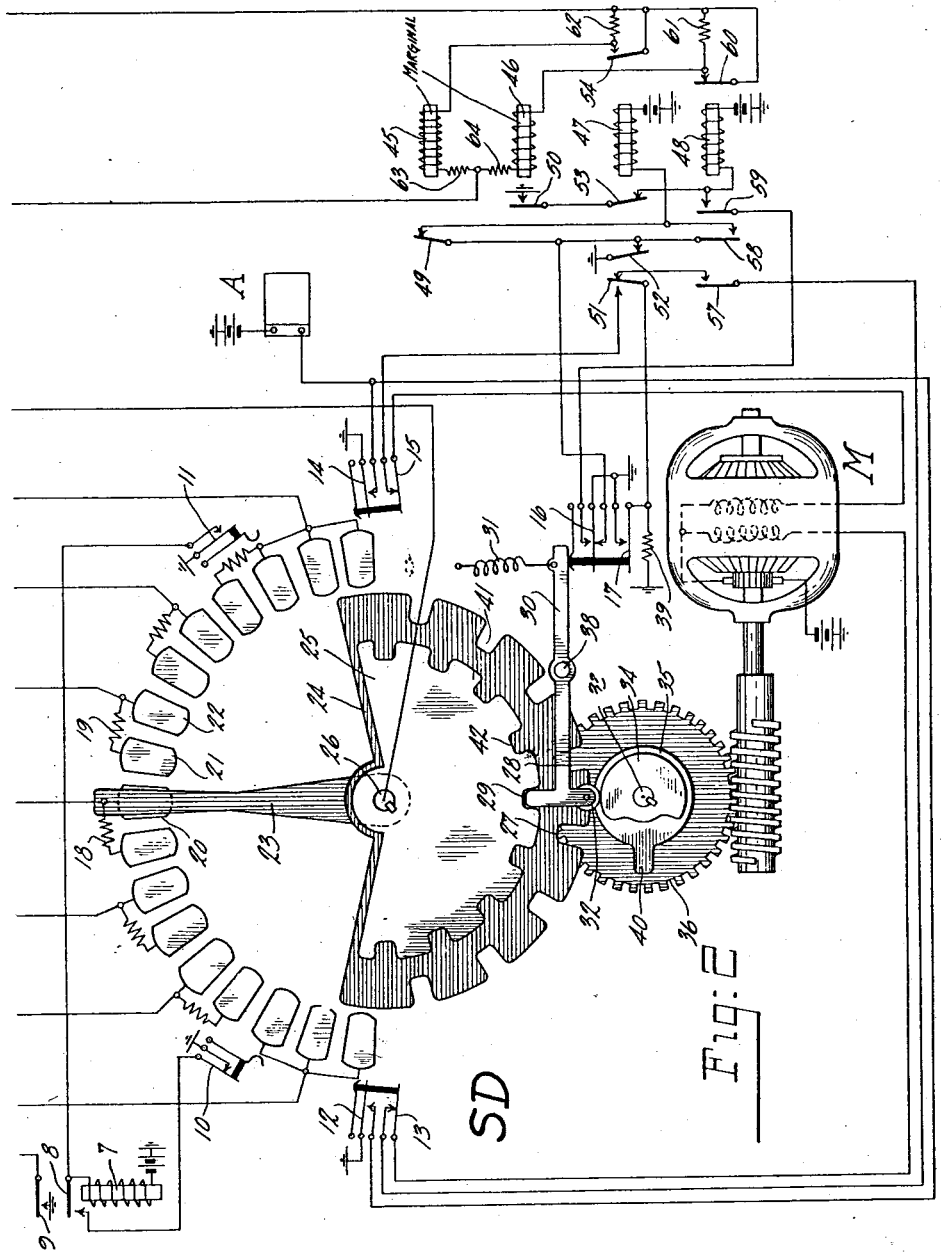
Inventors
Eric D. Smith—William H. Perkins
Atty.

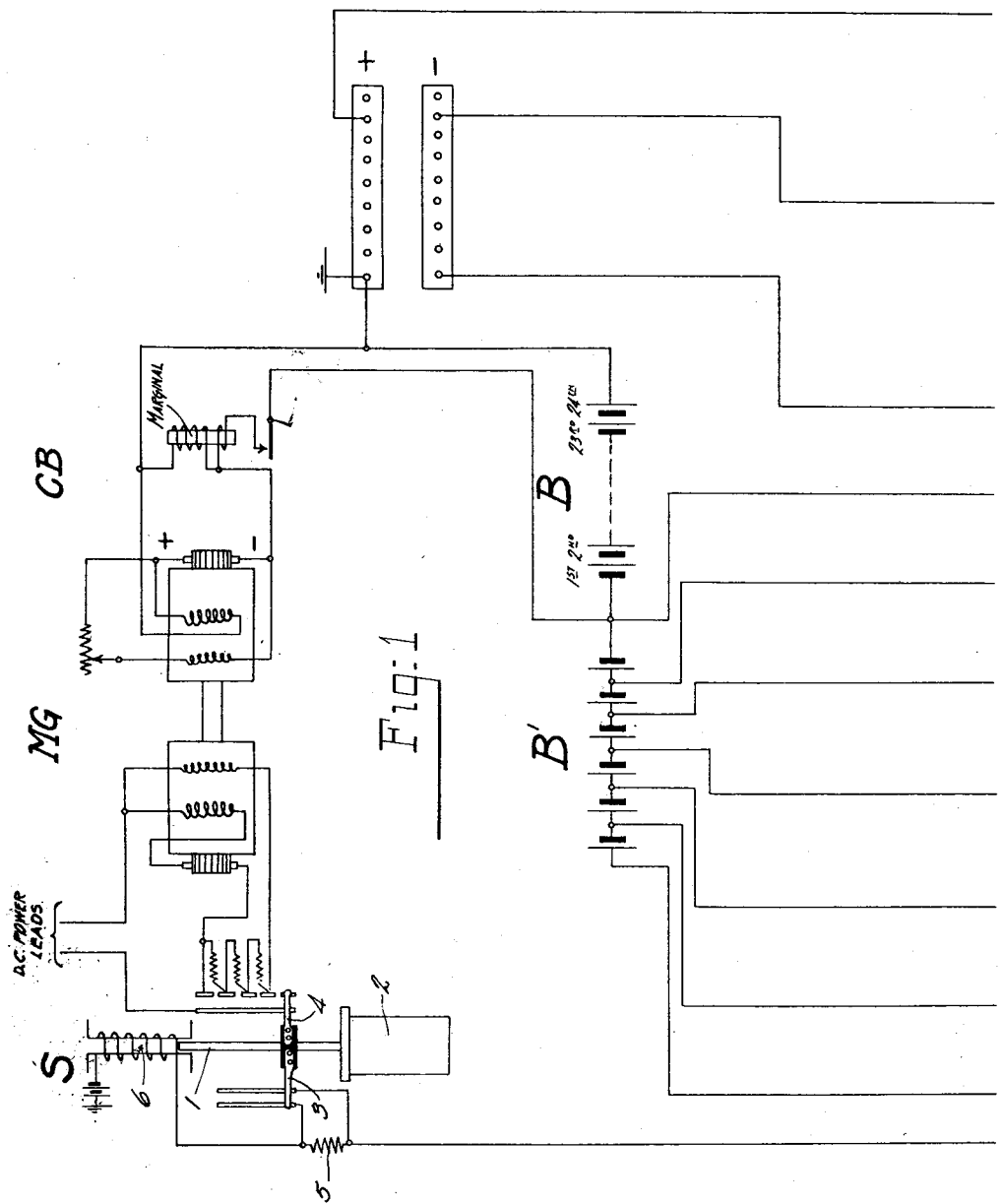

Patented Nov. 15, 1927.

1,649,136

UNITED STATES PATENT OFFICE.

ERIC D. SMITH, OF CHICAGO, AND WILLIAM H. PERKINS, OF OAK PARK, ILLINOIS, ASSIGNORS, BY MESNE ASSIGNMENTS, TO AUTOMATIC ELECTRIC INC., OF CHICAGO, ILLINOIS, A CORPORATION OF DELAWARE.

AUTOMATIC BATTERY-CHARGING AND VOLTAGE-REGULATING SYSTEM.

Application filed May 27, 1922. Serial No. 564,088.

The present invention relates in general to automatic battery charging and voltage regulating systems, and the object of the invention, broadly stated, is to produce a new and improved system of this character operating on novel principles and possessing numerous advantages not found in prior systems.

A special object is the production of a new and improved step by step switching device, adapted to be driven by an ordinary electric motor, and particularly valuable in a system of the character herein described, although its utility is not limited to such systems, as will be pointed out hereinafter.

The above pointed out objects, together with the others not specifically mentioned at this time, will be explained fully in connection with the accompanying drawings, comprising Figs. 1 and 2, which show a complete battery charging and voltage regulating system including one mechanical embodiment of the improved switching device.

Referring to Fig. 1, there is shown a storage battery B, a counter cell battery B', a motor generator and associated equipment for charging the battery B, and a pair of bus-bars to which current is supplied by the battery B.

Figure 2 shows the improved switching device SD, the operating motor M, and various controlling relays.

The switching device SD, which is the device with which the invention is particularly concerned, has a set of contacts, as shown, which are adapted to be wiped over by the contact arm or wiper 23. The operating rack 24, the locking rack 25, and the wiper 23 are keyed to the shaft 26, which shaft may be rotatably mounted in any well known or desired manner. The wiper 23 is normally locked, as shown, by the locking lever 30, which is normally in one of the notches such as 29 in the periphery of the locking rack 25. The roller 32, which is secured to the locking lever 30, rides along the rim of the cam 34 or into the depression cut into the latter. The cam 34, single tooth gear wheel 35, and the gear wheel 36 are mounted on and keyed to the rotatable shaft 33. The gear wheel 36 is adapted to be turned in one direction or the other by the motor M, depending upon the direction in which the latter rotates. The springs 16 and 17 are controlled by the end of the locking lever 30, as may be readily seen.

Of the controlling relays 45–48, inclusive, the marginally adjusted relays 45 and 46 are bridged across the bus-bars shown in Fig. 1. The relays 47 and 48 are controlled by relays 45 and 46, respectively, and control the motor M as will be explained hereinafter.

The starter S, Fig. 1, is controlled by the switching device SD, Fig. 2, through the medium of relay 7. This starter is operated by the solenoid 6, which pulls the plunger 1 up when current flows through the former. In order to secure the proper slowness of operation of the plunger 1, the dash pot 2 is associated with the lower end thereof. This dash pot may be of any well known design. The starter S controls the motor of the motor generator MG, and the generator of the motor generator MG charges the battery B by sending current through the latter by way of the automatic circuit breaker CB. The battery B is assumed to comprise two dozen lead storage cells connected in series, of which only the first, second, twenty-third, and twenty-fourth are shown. This battery, when nearly discharged, has the potential which is desired for the bus-bars shown. When fully charged, however, the potential of the battery B is considerably higher than is desired for the bus-bars. The potential across the bus-bars is kept within the desired limits by cutting in or out the proper number of cells of the counter cell battery B'. This is done by the switching device SD as will be explained subsequently.

Although several batteries are shown associated with the relays and the like, it is to be understood that these batteries are shown for convenience only, and that the lower or negative bus-bar, Fig. 1, is actually connected to each point where one of the before mentioned batteries is connected. It will be understood also that the ground or positive bus-bar is connected to each point where ground is indicated.

The apparatus, having been described in general, will now be described in connection with a detailed description of its operation. For this purpose it will be assumed that the potential across the bus-bars shown in Fig. 1 drops below the desired point. That being the case, the marginally adjusted low voltage relay 45, which is bridged across these bus-bars through the resistances 62 and 63, releases its armature 49, thereby opening the circuit of relay 47. Relay 47 now deenergizes and at armature 54 places a shunt around resistance 62 so as to enable relay 45 to again attract armature 49 when the potential across the bus-bars is raised the desired amount. As a further result of the deenergization of relay 47, it opens a point in the circuit of relay 48 at armature 53 so as to guard against any possible energization of this relay at this time; opens a point in its own previously established locking circuit at armature 52; and at armature 51 opens a point in the circuit of the left hand field winding of the series wound motor M, and closes a circuit for the motor M by way of the right hand field thereof as follows: from ground by way of resistance 39, armature 51 and its resting contact, contact of spring 15 and said spring, right hand field winding of the motor M, and the armature of the motor M to battery. The right hand field winding of the motor M is wound in a direction opposite to that in which the left hand field winding is wound, and in a direction to cause the motor M to drive the wheel 36 through the medium of the worm gear in a counter clockwise direction. Even though the motor M is running at this time at practically no load, it does not operate unduly fast owing to the fact that the resistance 39 is included in its circuit. The gear wheel 36 continues to rotate in a counter clockwise direction without producing any particular result other than that the roller 32 revolves as the cam 34 passes under it. This keeps up until the notch cut in the cam 34 comes under the roller 32. When this occurs, the roller 32 rides down into the notch in the cam 34, the lever 30 being operated under the tension of the stiff spring 31. Upon the lever 30 moving slightly, the springs 16 and 17 operate. Spring 17, upon coming into engagement with its contact, places a shunt around the resistance 39 so as to enable the motor M to operate the wiper assembly at the desired speed. Spring 16, upon breaking away from its lower contact, opens a point in the pick-up circuit of relay 47. This insures that the motor M will not be stopped at an undesirable point.

As the locking lever 30 moves further, owing to the roller 32 going deeper into the notch in the cam 34, it comes out of the notch 29 in the locking rack 25, thereby leaving the latter free to rotate except for such friction as may be between the wiper 23 and the contact it is standing on and the friction of the shaft 26 in its bearing. Just after the locking lever 30 has cleared the rack 25, the tooth 40 on the wheel 35 comes into engagement with the left hand side of the notch 28 in the rack 24. As the motor continues to run, the tooth 40 rotates the wiper assembly in a clockwise direction until the former disengages from the notch 28, which occurs when the notch 28 is in approximately the position occupied by the notch 27 in the drawing. At this time the notch 42 in the locking rack 25 is in the position occupied by the notch 29 in the drawing, and the wiper 23 has moved from the contact 20 across contact 21 and is in engagement with contact 22.

Just after the tooth 40 moves out of engagement with the notch 28, the roller 32 begins to ride up towards the periphery of the cam 34 again, and pushes the locking lever 30 into the notch 42. It will be noted that the edges of the notches, such as 42, are slightly rounded, and also that the end of the locking lever 30 which engages these notches is slightly bevelled. This allows for any slight mechanical inaccuracy and also provides for centering the wiper 23 on a contact in case certain parts become slightly worn after long continued use. Just before the locking lever 30 completes its movement, the springs 16 and 17 are switched back to the position shown in the drawing. Upon coming into engagement with its lower contact, spring 16 closes a point in the pick-up circuit of relay 47. Spring 17, upon moving out of engagement with its associated contact, again inserts the resistance 39 into the circuit of the motor M so as to prevent the latter from speeding up when the load is removed.

Regarding the operation of the wiper 23 in raising the potential between the bus-bars, it will be noted that the said wiper 23, which controls the current of the negative bus-bar, comes into engagement with contact 21 before it breaks away from contact 20. This is necessary in order to prevent the negative bus-bar from being momentarily disconnected. It will be noted that a local circuit is closed at this time for the counter cell of the battery B' which is connected between the contacts 20 and 22. However, an excessive flow of current in this local circuit is prevented by the resistance 19, which resistance is very low and does not appreciably affect the potential of the negative bus-bar. As the wiper 23 is moved further it comes out of engagement with contact 20, thereby opening the local circuit of the counter cell which is being cut out, and, upon moving into engagement with contact 22, cuts out the resistance 19.

Assuming that the removal of the counter cell, as described above, brings the potential of the negative bus-bar up to the desired point, which is ordinarily the case, relay 45 pulls up again as soon as, or perhaps slightly before, wiper 23 comes to rest, and, upon so doing, closes a point in the circuit of relay 47. Assuming that this occurs before spring 16 shifts back to normal, relay 47 does not energize for the time being. In any event, however, regardless of which takes place first, as soon as these two things have happened, relay 47 energizes over the following circuit: from ground by way of spring 16 and its lower contact, armature 49 and its working contact, and relay 47 to battery. Relay 47, upon energizing, removes the shunt from around resistance 62 at armature 54 so as to prepare relay 45 for its next operation; prepares a circuit for relay 48 at armature 53; closes a locking circuit for itself at armature 52 independent of spring 16 and its lower contact; and at armature 51 opens the circuit of the motor M and prepares a circuit for operating the said motor M in the reverse direction. The motor M now comes to rest due to friction and stops with the single toothed gear wheel in approximately the position shown in the drawing.

As the voltage of the battery B drops lower, due to the battery becoming more and more nearly discharged, relay 45 falls back again, whereupon the above described operations are repeated with the result that wiper 23 moves over two more contacts and another counter cell is cut out.

The next time the potential of the negative bus-bar drops below the desired point, the last counter cell is cut out and the wiper 23 comes to rest in engagement with the contact under the end of the spring assembly containing the spring 11. When the wiper 23 comes into this position, the end thereof operates the spring 11 through the medium of the auxiliary spring and the insulating bushing. Spring 11, upon coming into engagement with its associated contact, closes a circuit for relay 7. Relay 7, upon energizing, closes a locking circuit for itself at armature 8, and at armature 9 closes a circuit for the solenoid 6 of the starter S, by way of the parallel contacts wiped over by the contact arm 3. Upon energizing, solenoid 6 attracts the plunger 1, which plunger, as before stated, is retarded by the dash pot 2. As the plunger rises, the contact arm 4 is brought into engagement with the first active contact and closes a circuit for the motor of the motor generator MG. The motor then begins to pick up speed. A short time later, the contact arm 4 comes into engagement with the next contact and successively with the others until the last contact is reached, at which time the motor generator is operating at full speed and is straight across the line. Just before the plunger reaches its highest position, the contact arm 3 passes off the ends of the associated contacts, thereby introducing the resistance 5 into the circuit of the solenoid 6. This resistance is low enough to permit the continued energization of the solenoid 6 and is high enough to prevent the solenoid from heating up.

On the generator side of the motor generator, the voltage rises as the machine speeds up, and when it has reached the desired point, which is higher than the voltage of the battery B, a sufficient amount of current flows through the shunt winding of the marginally adjusted circuit breaker CB to operate the said circuit breaker. When the contacts of the circuit breaker close, current starts to flow through the battery B in the proper direction to charge it. This current passes through the series field of the generator, which field is wound in opposition to the main or shunt field and comprises a comparatively small number of turns. This field is used to keep the output of the generator at a fairly steady point. The generator is so adjusted that the voltage rises considerably higher than normal when the circuit breaker CB is open. This sends a fairly high current through the shunt winding of the circuit breaker and allows the latter to pick up. After the circuit breaker has operated, the potential across the terminals of the generator is reduced to practically the potential across the terminals of the battery B. The shunt winding alone of the circuit breaker is not able to hold the circuit breaker in its operated position at this potential, and the circuit breaker is held in only by the combined energization of the shunt and the series windings.

When the potential across the bus-bars rises above a predetermined limit, due to the accumulating charge of the battery B, the marginally adjusted high voltage relay 46 energizes. Upon energizing, relay 46 closes, at armature 50, a circuit for relay 48 by way of armature 53 and its working contact. Relay 48, upon energizing, removes the shunt from around resistance 61 at armature 60 so as to prepare relay 46 for its next operation; prepares a locking circuit for itself at armature 59; places a shunt around armature 49 and its working contact at armature 58 so as to prevent any possible deenergization of relay 47 at this time; and at armature 57 closes a circuit for the motor M in series with the left hand field winding thereof as follows: from ground by way of resistance 39, armature 51 and its working contact, working contact of armature 57 and said armature, resting contact of spring 13 and said spring, left hand field winding of the motor M, and the armature of the motor M to battery. The motor M now turns in a direction opposite to that in which it turned in the previously assumed example, and consequently rotates the gear wheel 36 in a clockwise direction. The locking lever 30 operates to shift the springs 16 and 17 in the previously described manner just before the tooth 40 on the wheel 35 is in position to engage a notch in the rim of the rack 24. Spring 17, upon coming into engagement with its associated contact, shorts out the resistance 39 for reasons hereinbefore given. Spring 16, upon coming into engagement with its working contact, completes a locking circuit for relay 48 so as to prevent the deenergization of the said relay 48 before the desired movement has been completed. The locking lever 30, upon moving a little further, clears the rack 25 as hereinbefore described. A moment later the tooth 40 on the wheel 35 comes into engagement with the notch 41 in the rack 24, which notch, at this time, is in the position occupied by the notch 27 in the drawing. As the tooth 40 is rotated around, the rack 24, together with the wiper 23 and the rack 25, is rotated in a counter clockwise direction until the wiper 23 has moved the distance of two contacts. This cuts in the first counter cell. The tooth 40 leaves notch 41 when the latter is in the position occupied by the notch 28 in the drawing. A moment later, the roller 32 starts to ride up on the wheel 34 and locks the rack 25 in the usual manner. After the rack 25 is securely locked and just before the locking lever 30 is moved to its fullest extent, the springs 16 and 17 are shifted back to normal. Spring 17 cuts the resistance 39 into the circuit of the motor M as hereinbefore described. Spring 16, upon moving out of engagement with its upper contact, opens the locking circuit of relay 48. Assuming that the cutting in of the first counter cell brings the potential across the bus-bars down to the desired point, relay 46 deenergizes, upon, or a little before, the movement of the wiper 23 being completed as before described. After relay 46 has deenergized and spring 17 has shifted back to normal, it being immaterial which occurs first, relay 48 deenergizes and replaces the shunt around resistance 61 at armature 60 so as to prepare relay 46 for its next energization. As a further result of the deenergization of relay 48, it disconnects the upper contact of spring 16 at armature 59; removes the shunt from around armature 49 and its working contact at armature 58; and at armature 57 opens the circuit of the motor M, whereupon the said motor stops.

As the potential of the battery B rises higher and higher due to the accumulating charge, the counter cells are cut in one by one in the above described manner. This occurs without producing any other result until the last counter cell is cut in, at which time the wiper 23 will have been brought into such a position that the end thereof is in engagement with the auxiliary spring of the spring assembly including the spring 10. This opens the locking circuit of relay 7. Relay 7, upon deenergizing, opens a further point in its locking circuit at armature 8, and at armature 9 opens the circuit of the solenoid 6 of the starter S. When this occurs, the plunger 1 immediately drops to its normal position, the dash pot 2 being arranged so as to have practically no retarding effect on the return of the plunger 1. This, of course, opens the circuit of the motor generator MG. The motor generator now slows down and stops. When the current flow through the series winding of the circuit breaker CB falls to zero, or thereabout, the armature of the circuit breaker is released owing to the fact that it cannot be maintained energized by the shunt winding alone at the voltage of the battery B. The battery B is now disconnected from the motor generator MG, and the motor generator MG remains at rest until it is started again when the wiper 23 again reaches the starting position and operates spring 11.

The spring assemblies on the left and right hand sides of the switching device SD, comprising springs 12-15, inclusive, come into use in case the wiper of the switching device is rotated in either direction until it comes into engagement with the last contact. This may occur upon the failure of certain relays to operate or upon the failure of certain other relays to operate properly, as will be readily understood. Assuming that the wiper 23 is rotated in a clockwise direction until it comes into engagement with the last contact, the end of the said wiper 23 strikes the insulated auxiliary spring associated with the springs 14 and 15. When this occurs, spring 14 is moved into engagement with its associated contact and spring 15 is moved out of engagement with its associated contact, thereby closing a circuit for the alarm buzzer A at spring 14 and disconnecting the right hand field winding of the motor M at spring 15. The operation of the alarm buzzer A signals an attendant who may proceed to remove the cause of the trouble. The disconnecting of the right hand field winding of the motor M insures that the said motor M does not drive the wiper 23 any further in a clockwise direction. In case wiper 23 is moved into engagement with the last contact on the left hand side, springs 12 and 13 are operated, whereupon a circuit is closed for the alarm buzzer A as before. Also, the left hand field winding of the motor M is disconnected at spring 13 so as to prevent any further operation of the wiper 23 in a counter clockwise direction.

It is to be expressly understood that the mechanical embodiment of the improved switching device may assume a great many different shapes and is subject to many modifications and variations, and that the device itself may be put to a great number of widely different uses, such as, for example, varying the number of effective turns of a transformer winding by cutting sections in and out or cutting resistances in and out for starting motors and the like, and for many other uses which will readily suggest themselves to those skilled in the art.

It is to be understood also that, while only one wiper or contact arm is shown on the present switching device, as many separate insulated wipers may be provided as is found necessary in any situation in which the switching device may be used. It is to be further understood that, while the switching device is shown having a rotary movement, it may be applied equally well to a switching device having any other movement, such as, for example, one which slides back and forth over contacts placed in a straight line.

The various features of the invention, having been described in the foregoing, will now be pointed out in the appended claims.

What is claimed is:

1. In a switching device, a contact carrying member, a motor having a revolving armature, means driven by said motor effective only during certain rotations thereof to in turn transmit motion to said contact carrying member in a step by step manner, means for stopping said motor, and means for preventing said stopping means from stopping said motor as long as said contact carrying member is being moved.

2. In a switching device, a contact carrying member, a motor having a revolving armature geared to move said member at intervals during the revolution of said armature, an electric circuit for operating said motor, an impedance in said circuit, and means for removing said impedance from said circuit each time the said member is being operated.

3. In a switching device, a contact carrying member, a motor having a revolving armature which only actuates said contact carrying member during certain revolutions of the armature, a circuit for operating said motor, means for opening said circuit, and means for preventing the last named means from opening said circuit while said contact carrying member is being moved.

4. A voltage regulating system for a storage battery comprising counter cells, a contact arm for cutting said cells in or out of circuit with the battery, a rack and pinion for operating said contact arm, the parts being so proportioned that one cell is cut in or out for each revolution of the pinion, intermediate gearing and a motor of the revolving armature type for driving said pinion, relays sensitive to changes in the battery voltage for starting said motor running in either direction, and controlling circuits independent of said relays and effective when the motor is started for causing the motor to run long enough to bring about a complete revolution of said pinion.

5. A voltage regulating and battery charging system comprising counter cells, a switching device for cutting said cells out of circuit with the battery during discharge, a rack and pinion for operating said switching device, reduction gears and a motor for driving said pinion, a relay sensitive to changes in the battery voltage for starting said motor at the proper times, a charging circuit, and means for automatically completing the charging circuit when the last counter cell is cut out.

6. A voltage regulating and battery charging system comprising counter cells, a switching device for cutting said cells out of circuit with the battery during discharge, a rack and pinion for operating said switching device, reduction gears and a motor for driving said pinion, a relay sensitive to changes in the battery voltage for starting said motor at the proper times, a charging circuit, means for automatically completing the charging circuit when the last counter cell is cut out, a second relay sensitive to changes in the battery voltage, and a circuit controlled by said second relay from time to time during the charge for driving said motor in the reverse direction to cause said switching device to cut said counter cells in circuit with the battery one at a time.

7. A voltage regulating and battery charging system comprising counter cells, a switching device for cutting said cells out of circuit with the battery during discharge, a rack and pinion for operating said switching device, reduction gears and a motor for driving said pinion, a relay sensitive to changes in the battery voltage for starting said motor at the proper times, a charging circuit, means for automatically completing the charging circuit when the last counter cell is cut out, a second relay sensitive to changes in the battery voltage, a circuit controlled by said second relay from time to time during the charge for driving said motor in the reverse direction to cause said switching device to cut said counter cells in circuit with the battery one at a time, and means actuated when the last counter cell is connected in circuit for stopping the charge.

8. A voltage regulating system for a storage battery comprising counter cells, a relay sensitive to a drop in the battery voltage, a motor, a circuit for said motor controlled by said relay, a one tooth pinion driven by said motor, a rack operated by said pinion and carrying a contact arm for cutting said counter cells out of circuit with the battery one at a time, a resistance normally included in the motor circuit to limit the speed while said tooth is out of engagement with the rack, and means for automatically shunting said resistance to increase the power while the tooth is in engagement with the rack.

9. In a switching device, a contact carrying member, a toothed rack attached to said member, an electric motor, a pinion geared to the armature of said motor and arranged to engage a tooth of said rack to advance said member one step for each revolution of said pinion, means for stopping said motor, and means for rendering said stopping means inoperative while said member is being moved.

10. In a switching device, a contact carrying member, a toothed rack attached to said member, an electric motor, a pinion geared to the armature of said rack to advance said member one step for each revolution of said pinion, a circuit for said motor, an impedance in said circuit, and means for removing said impedance from the circuit only during the interval that said member is being moved.

11. In a switching device, a contact carrying member, toothed operating and locking racks attached to said member, an electric motor, a pinion geared to the armature of said motor and arranged to engage a tooth of said rack to advance said member one step for each revolution of said pinion, a locking lever normally engaging said locking rack, a cam attached to said pinion, against which a projection of said locking lever rests, said cam withdrawing said lever from said locking rack just before said pinion engages said tooth and returning said lever into engagement with said rack just after said pinion has advanced said member.

12. In a switching device, a contact carrying member, toothed operating and locking racks attached to said member, an electric motor, a pinion geared to the armature of said motor and arranged to engage a tooth of said rack to advance said member one step for each revolution of said pinion, a locking lever normally engaging said locking rack, a cam attached to said pinion, against which a projection of said locking lever rests, said cam withdrawing said lever from said locking rack just before said pinion engages said tooth and returning said lever into engagement with said rack just after said pinion has advanced said member, means for stopping said motor and springs operated by said lever to disable said stopping means while said lever is withdrawn from said locking rack.

13. In a switching device, a contact carrying member, toothed operating and locking racks attached to said member, an electric motor, a pinion geared to the armature of said motor and arranged to engage a tooth of said rack to advance said member one step for each revolution of said pinion, a locking lever normally engaging said locking rack, a cam attached to said pinion, against which a projection of said locking lever rests, said cam withdrawing said lever from said locking rack just before said pinion engages said tooth and returning said lever into engagement with said rack just after said pinion has advanced said member, a circuit for said motor, an impedance in said circuit, and springs operated by said lever for removing said impedance from said circuit while said lever is withdrawn from said locking rack.

In witness whereof, I hereunto subscribe my name this 25th day of May, A. D., 1922.

ERIC D. SMITH.

In witness whereof, I hereunto subscribe my name this 25th day of May, A. D., 1922.

WILLIAM H. PERKINS.